Jan. 16, 1951 R. D. BUDD 2,537,964
ARTICULATED CONNECTION FOR SHAKER CONVEYERS
Filed March 14, 1947 3 Sheets-Sheet 3
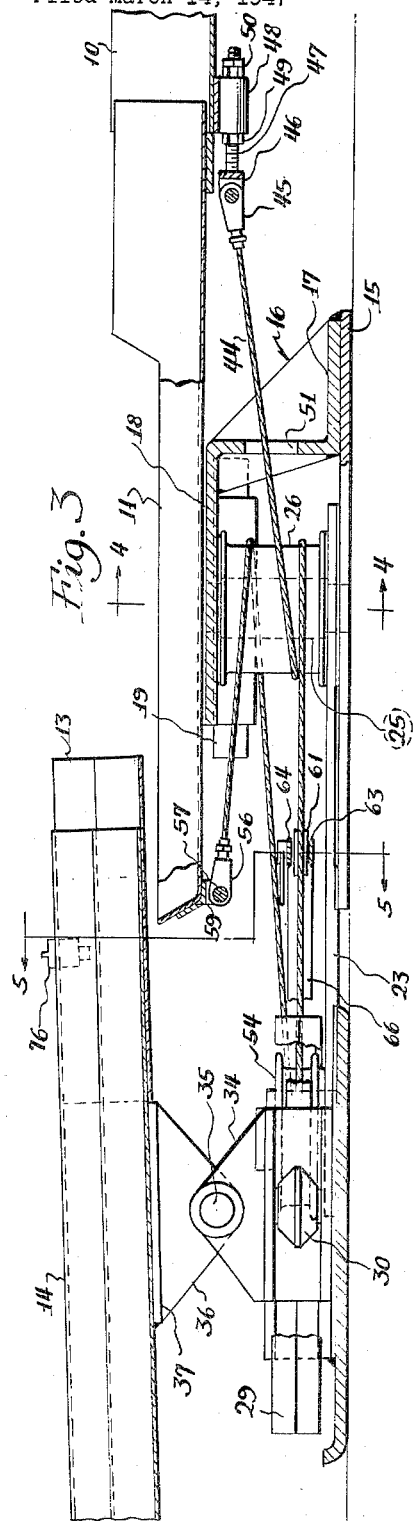

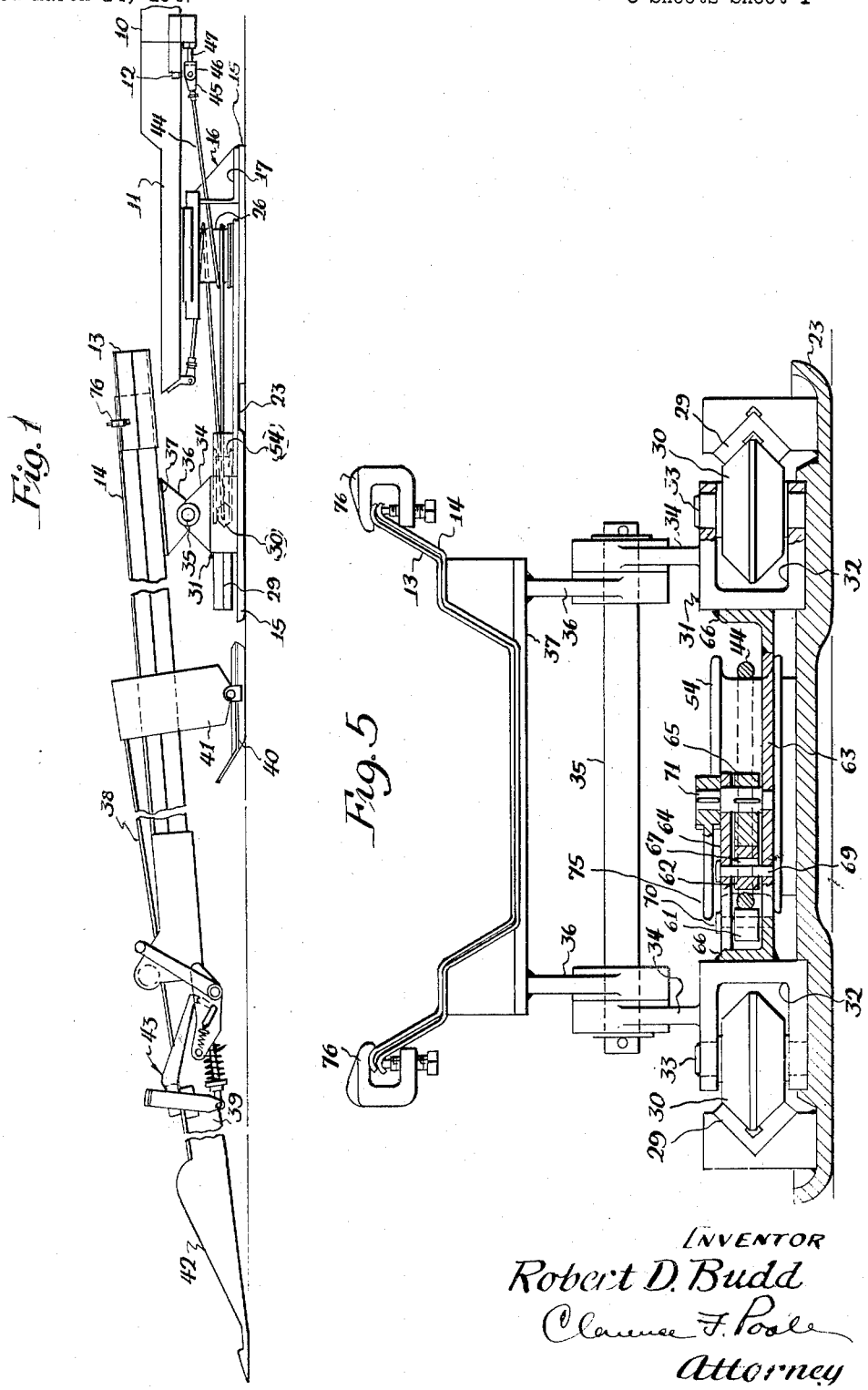

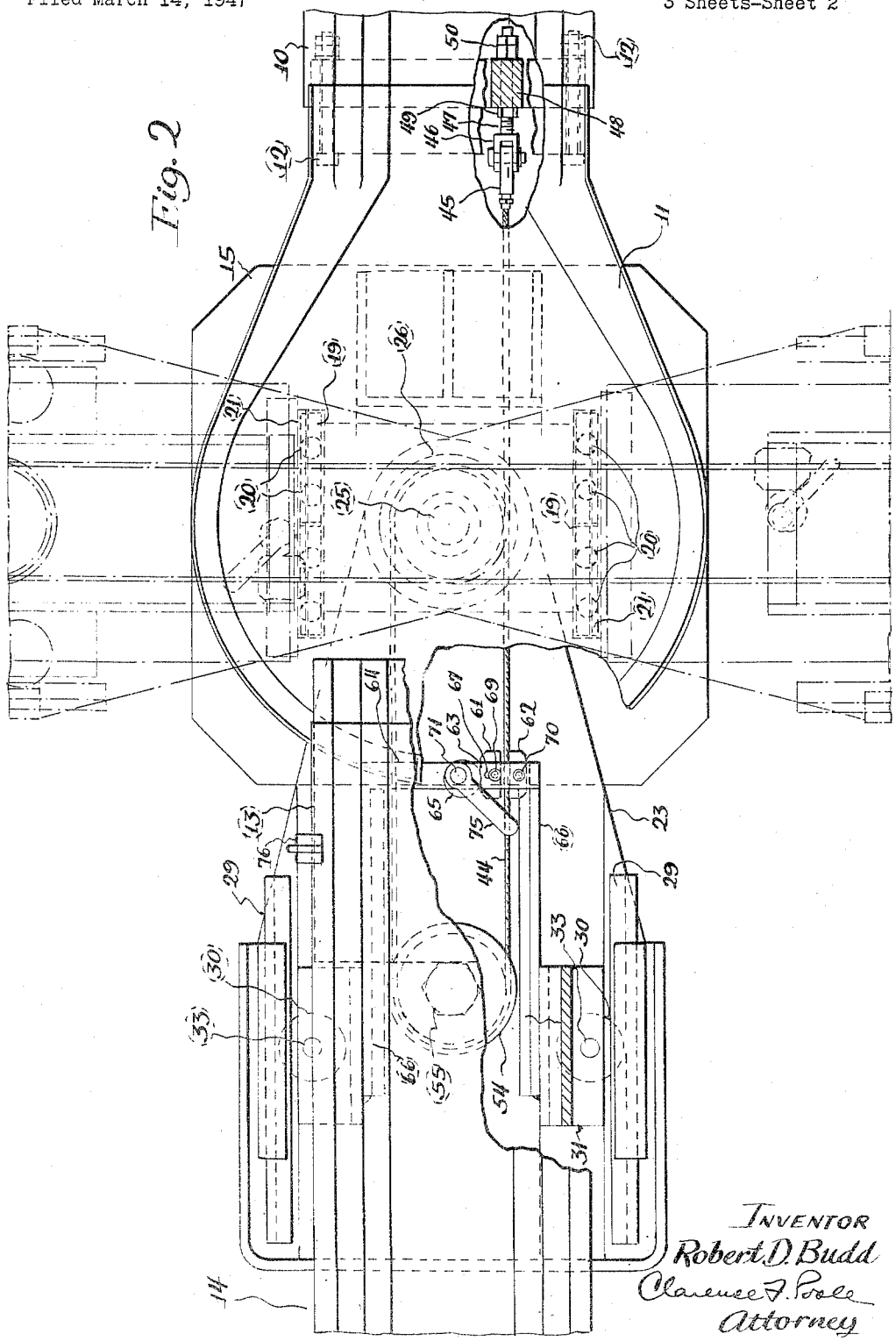

Patented Jan. 16, 1951

2,537,964

UNITED STATES PATENT OFFICE 2,537,964

ARTICULATED CONNECTION FOR SHAKER CONVEYERS

Robert D. Budd, Denver, Colo., assignor to Goodman Manufacturing Company, Chicago, Ill., a corporation of Illinois Application March 14, 1947, Serial No. 734,670

3 Claims. (Cl. 198—220)

This invention relates to improvements in articulated connections for shaker conveyors, and has among other objects to provide a novel and improved form of articulated connection or swivel in a shaker conveyor trough line permitting one portion of a shaker conveyor trough line to be horizontally moved about a vertical axis and efficiently driving the laterally movable portion of the trough line from the main portion of the trough line with the same conveying action as the main portion of the trough line, when the movable portion of the trough line is in various positions of lateral adjustment with respect to the main portion of the trough line.

This and other objects of my invention will appear from time to time as the following specification proceeds and with reference to the accompanying drawings wherein:

Figure 1 is a view in side elevation of the inby end of a shaker conveyor trough line having an articulated connection constructed in accordance with my invention embodied therein;

Figure 2 is an enlarged fragmentary plan view of the articulated connection with certain parts broken away in order to show certain detailed features of my invention;

Figure 3 is a fragmentary view in side elevation of the articulated connection, drawn to a slightly larger scale than Figure 2, with certain parts thereof shown in longitudinal section;

Figure 4 is an enlarged transverse sectional view taken substantially along line 4—4 of Figure 3; and Figure 5 is an enlarged transverse sectional view taken substantially along line 5—5 of Figure 3.

In the drawings, the forward end of a reciprocating trough 10 on the inby end of a shaker conveyor trough line is shown as having a widened material receiving pan 11 secured to its forward end as by connecting bolts 12, 12 (see Figure 2). The sides of said pan are of an arcuate formation in plan and conform to the path of travel of the discharge end of a short discharge trough 13 extensibly mounted on the discharge end of a laterally movable driven trough 14, to receive material discharged from said discharge trough when said driven trough is in various positions of lateral adjustment with respect to said pan. Said trough 10 may be reciprocably driven through the shaker conveyor trough line in such a manner as to cause material to move from the inby to the outby end of the trough line, by a suitable reciprocating drive mechanism at the outby end of the trough line (not shown).

The pan 11 is reciprocably mounted on a base 15 which is adapted to be held in fixed relation with respect to the ground by suitable holding means, such as jacks (not shown) which may be interposed between said base and the mine roof. The mounting of said pan on said base includes an upright support frame 16 secured to said base on a rearwardly projecting horizontal base portion 17 and having a vertically spaced widened horizontal support 18 extending in a direction opposite from said base portion 17. Said widened support has a pair of longitudinally extending semi-circular guide members 19, 19 secured to and extending along opposite sides thereof, and opening to the outer side thereof. Said guide members form a guide track for balls 20, 20 which are adapted to form an antifriction support and guide means for semi-circular guide members 21, 21 corresponding to and facing said guide members 19, 19. The guide members 21, 21 are secured to the vertical legs of angles 22, 22 which are secured to and depend from the bottom of said pan 11 and extend therealong.

The driven trough 14 is mounted on the end of a laterally movable arm 23 journaled for movement with respect to said base about a vertical axis on a flanged bearing 24. The flange of said bearing rests on the top surface of said base 15 and said bearing is mounted on a vertical shaft 25. Said shaft is mounted at one of its ends in said base and at its opposite end in the horizontal support 18 of the support frame 16. Said shaft also has an idler drum 26 journaled thereon for rotation with respect thereto, the purpose of which drum will hereinafter more clearly appear as this specification proceeds.

The forward end of the arm 23 is adapted to slidably engage the ground in advance of the base 15. A pair of inwardly facing laterally spaced guide tracks 29, 29 are mounted on the top of the forward end portion of said arm and extend longitudinally along opposite sides of said arm in parallel relation with respect thereto (see Figures 2 and 3). Said guide tracks have facing recessed V-shaped engaging faces which are adapted to be engaged by the V-shaped engaging faces of rollers 30, 30 mounted on a trough supporting carriage 31 on vertical pins 33, 33, and to form a longitudinal support and guide for said carriage. Said carriage is also suitably guided on the top surface of said arm 23 to prevent tipping thereof in one direction or another. Said rollers are mounted within outwardly facing channels 32, 32 extending along opposite sides of the bottom of said carriage, and said pivotal pins are mounted at their ends in the upper and lower sides of said channels. Said carriage has a pair of parallel spaced longitudinally extending upright legs 34, 34 extending upwardly from said channels, which are adapted to form a transverse pivotal support for the reciprocating trough 10 on a transverse shaft 35. Said shaft extends through said legs and through laterally spaced bracket members 36, 36 abutting the insides of said legs and depending from a plate 37. Said plate extends across the bottom of said reciprocating trough and is suitably secured thereto.

The driven trough 14 is herein shown as being connected adjacent its forward end to the rearward portion of a friction grip feeding device 43, which is supported by and frictionally engages a pair of grip rails 38, 38 disposed along opposite sides of an extensible trough 39 (see Figure 1). Said extensible trough is supported adjacent its rear end on a ground-engaging shoe 40 and legs 41, 41 transversely pivoted to said shoe and secured to the underside of said grip rails. A shovel 42 extends forwardly from said extensible trough and slidably supports the forward end of said trough on the ground. The friction grip feeding device 43 may be provided to extensibly or retractibly move said shovel with respect to said reciprocating trough, to feed said shovel into the loose material and pick it up from the ground. Said friction grip feeding device may be of any well known form and is no part of my present invention so is not herein shown or described in detail.

The mechanism for reciprocably driving the driven trough 14 from the trough 10 when said driven trough is laterally displaced with respect to said driving trough about the axis of the vertical shaft 25, includes a flexible drive member 44, such as a rope or flexible cable, it being understood that a link chain or any other flexible member may be used as well as a rope or cable. Said cable is connected at its ends at points disposed on opposite sides of the axis of pivotal movement of said driven trough 14, and is maintained taut throughout its entire length in all positions of said driven trough with respect to said driving trough, and has a looped portion laterally movable with said driven trough which is adapted to have said driven trough operatively connected thereto. As herein shown, said cable has a connecting member 45 secured to one of its ends, which is pivotally connected to a clevis 46 extending forwardly from and herein shown as being formed integrally with a threaded rod 47 (see Figures 2 and 3). Said rod extends through a lug 48 depending from the bottom of said trough 10, and is held in the desired position of adjustment with respect thereto by means of a nut 49 abutting the forward end of said lug, and lock nuts 50, 50 abutting the rear end of said lug. Said nuts 49 and 50, 50 provide a means to adjust the tension of said cable the required amount when initially setting up the drive. Said cable extends in a forward direction from said clevis through an opening 51 in the support frame 16, to and completely around the idler drum 26. From said idler drum said cable extends in a forward direction around an idler sheave 54 mounted adjacent the forward end of the arm 23 on a vertical pivotal pin 55. From thence said cable extends in a rearward direction to and around said idler drum 26 and forwardly therefrom and is connected at its forward end to the forward end of the pan 11. The connection from the forward end of said cable to the forward end of said pan includes a connecting member 56 secured to the forward end of said cable. A pivotal pin 57 pivotally connects said connecting member to a lug 59 depending from the forward end of the pan 11.

It may be seen with reference to Figure 2 that a laterally movable loop is formed in said cable 44, one bight of which is engaged by the idler sheave 54 and the other bight of which is engaged by the idler drum 26, and that as one side of said loop wraps around or is unwrapped from said idler drum upon movement of the driven trough 14 in one direction or another from the position shown by solid lines in Figure 2 to either of the positions shown by dotted lines in said figure, the other side of said loop will be unwrapped from or wrapped around said idler drum the same distance the first-mentioned side of said loop is wrapped around or unwrapped from said drum. The cable 44 is thus maintained taut in all positions of lateral adjustment of said driven trough with respect to said driving trough.

A clamping connection is provided to detachably clamp the frame or carriage 31 to one section of the cable 44 between the idler drum 26 and the idler sheave 54. Said clamping connection may be of any well known form but is herein shown as being a quickly detachable clamping means including two grip blocks 61 and 62 mounted between two parallel, vertically spaced, transversely extending bars 63, 64 and engaged with opposite sides of said cable by means of an eccentric disk or cam 65. The bar 63 extends across and is secured to the forward ends of two parallel spaced angles 66, 66 secured at their inner ends to the closed inner sides of the channels 32, 32 of the carriage 31 and extending therefrom towards the idler drum 26. The grip block 61 is provided with a transversely extending slotted portion 67 and is mounted between said bars on a pivotal pin 69 mounted adjacent its opposite ends in said bars. The grip block 62 is pivotally mounted between said bars on a pivotal pin 70, mounted adjacent its opposite ends in said bars. The eccentric disk 65 engageable with the grip block 61, is keyed on a vertical shaft 71 mounted in said bars inwardly of said grip blocks, and extending upwardly therefrom. An operating arm or handle 75 is herein shown as being keyed to the upper end of said shaft for moving said eccentric disk in a direction to engage said grip blocks with opposite sides of the cable 44 and to lock said blocks in engagement with said cable when moved past a dead center position, when it is desired to reciprocably drive the driven trough 14 from the driving trough 10.

In Figure 2 of the drawings, the troughs 10 and 14 are shown as being in the central part of the stroke of the conveyor, but when initially clamping the grip blocks 61, 62 to the cable 44, said grip blocks should be engaged with the cable at one end or the other of the stroke of the driving trough 10 and the carriage 31 should be in the same relation with respect to its path of travel along the guide tracks 29, 29. Said guide tracks are sufficiently long to take care of the different positions of the rollers 30, 30 therealong as said cable is wrapped on or unwrapped from said idler drum.

The grip blocks 61 and 62 are spaced a sufficient distance from the idler drum 26 and the idler sheave 54 when in the central part of the stroke of the conveyor that when said trough 14 is pivotally moved to the right from the position shown by solid lines in Figure 2 to the position shown by broken lines at the top of Figure 2, and the trough 14 is drawn closer to the idler drum 26 due to the wrapping around of the side of the loop engaged by said grip blocks on said idler drum, said grip blocks 62 will clear said idler drum 26 at the rear end of the stroke of the conveyor. Also when said trough is moved to the left from the position shown by broken lines at the lower part of Figure 2, said grip blocks and the eccentric 65 and handle 75 will clear the idler sheave 54 at the forward end of the stroke of the conveyor. Said driven trough may thus be swung from a central position to either extreme position shown in Figure 2 without changing the position of the grip blocks 61 and 62 with respect to the flexible cable 44. As said driven trough is swung to one extreme position or another the discharge trough 13 may be extended or retracted with respect thereto to assure the discharge of material into said loading pan in various positions of said discharge trough with respect to said loading pan. This is effected by loosening C-clamps 76, 76 clamping said troughs together and moving said trough 13 along said trough 14, and then tightening said C-clamps when said troughs are in the desired position with respect to each other.

It may be seen from the foregoing that the cable 44 connected at its end to the driving trough 10 and pan 11 on opposite sides of the idler drum 26, is so trained around said idlers 26 and 54 that when said cable is adjusted to the proper tension, it will remain taut in all positions of the arm 23 and driven trough 14 with respect to said driving trough and that when the grip blocks 61 and 62 are clamped to one side of the looped portion of said cable intermediate said idler sheaves, said driven trough may be moved into various positions of adjustment with respect to said driving trough without adjusting the gripping position of said grip blocks and that said driven trough will be reciprocably driven from said driving trough 10 with a conveying action acting in the direction of the longitudinal axis of said driven trough, when said driven trough is in all lateral positions of adjustment with respect to said driving trough.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. An articulated connection for a shaker conveyor trough line including two troughs arranged in cascade relation one to the other and swivelled with respect to each other about a vertical axis disposed within the lateral limits of both of said troughs, a base adapted for supporting engagement with the ground beneath the adjacent ends of said troughs, an extension arm pivotally connected to said base about the axis of swivelling movement of said troughs and having horizontally reciprocable guiding relation with one of said troughs at a point remote from said axis, said base also having horizontally reciprocable guiding means thereon for the end of a second trough, means for driving one of said troughs from the other trough including an idler sheave rotatably mounted on said base coaxial with the axis of swivelling movement of said troughs, a second idler sheave mounted on and laterally movable with said extension arm, a flexible drive member secured by its ends to said second trough on opposite sides of the axis of said first-named idler sheave and trained around said first-named idler sheave, and also having an intermediate portion trained about said second-named idler sheave, and means connecting the first-named trough with an intermediate portion of the flexible drive member between said idler sheaves to afford driving connection with the last-named trough.

2. An articulated connection for a shaker conveyor trough line including two troughs arranged in cascade relation one to the other and swivelled with respect to each other about a vertical axis disposed within the lateral limits of both of said troughs, a base adapted for supporting engagement with the ground beneath the adjacent ends of said troughs, horizontally reciprocable guiding means for one of said troughs mounted on said base adjacent the axis of swivelling movement of said troughs, an extension arm pivotally connected to said base below said first-named horizontally reciprocable guiding means and extending beyond said base, other horizontally reciprocable guiding means for a second trough carried by said extension arm at a point remote from its pivotal axis, means for driving one of said troughs from the other trough including an idler sheave rotatably mounted on said base coaxial with the axis of swivelling movement of said troughs, a second idler sheave mounted on and laterally movable with said extension arm, a flexible drive member secured by its ends to said first trough on opposite sides of the axis of said first-named idler sheave and trained about said first-named idler sheave and also having an intermediate portion trained about said second-named idler sheave and means connecting the second trough with an intermediate portion of the flexible drive member between the said idler sheaves to afford driving connection with the last-named trough.

3. An articulated connection for a shaker conveyor trough line in accordance with claim 1 wherein the extension arm and the second trough, having horizontally reciprocable guiding relation therewith, are bodily swingable through an angle of 180° with respect to the first trough.

ROBERT D. BUDD.

REFERENCES CITED

The following references are of record in the file of this patent:

UNITED STATES PATENTS

| Number | Name | Date |
|---|---|---|
| 1,922,198 | Crawford et al. | Aug. 15, 1933 |
| 2,427,080 | Wilson | Sept. 9, 1947 |